US010914434B2

(12) United States Patent
Zhao et al.

(10) Patent No.: US 10,914,434 B2
(45) Date of Patent: Feb. 9, 2021

(54) FLASHLIGHT APPARATUS AND BATTERY CARTRIDGE FOR THE FLASHLIGHT APPARATUS

(71) Applicant: TECHNOMATE MANUFACTORY LIMITED, Hong Kong (CN)

(72) Inventors: Hebing Zhao, Dongguan (CN); Guosheng Liu, Dongguan (CN); Shuibo Tang, Dongguan (CN)

(73) Assignee: TECHNOMATE MANUFACTORY LIMITED, Hong Kong (CN)

( * ) Notice: Subject to any disclaimer, the term of this patent is extended or adjusted under 35 U.S.C. 154(b) by 0 days.

(21) Appl. No.: 16/675,068

(22) Filed: Nov. 5, 2019

(65) Prior Publication Data
US 2020/0309330 A1 Oct. 1, 2020

Related U.S. Application Data

(63) Continuation-in-part of application No. 29/685,726, filed on Mar. 29, 2019, and a continuation-in-part of
(Continued)

(51) Int. Cl.
*F21L 4/02* (2006.01)
*F21V 23/02* (2006.01)
(Continued)

(52) U.S. Cl.
CPC .............. *F21L 4/027* (2013.01); *F21V 5/00* (2013.01); *F21V 23/023* (2013.01);
(Continued)

(58) Field of Classification Search
CPC ... F21L 4/00; F21L 4/022; F21L 4/025; F21L 4/027; F21V 23/023; F21V 23/0421;
(Continued)

(56) References Cited

U.S. PATENT DOCUMENTS 1,958,796 A * 5/1934 Nickolas ................... F21L 4/00
362/187
4,265,984 A * 5/1981 Kaye ..................... H01M 2/105
429/178
(Continued)

FOREIGN PATENT DOCUMENTS

EP           2314912        4/2011
WO      WO2015049704       4/2015

*Primary Examiner* — Zheng Song
(74) *Attorney, Agent, or Firm* — Garson & Gutierrez, PC

(57) ABSTRACT

Flashlight apparatus, battery cartridge for the flashlight apparatus, and methods of manufacturing the same. In one embodiment, a battery cartridge is disclosed that includes a cartridge housing having two battery-receiving cavities disposed therein and an end cap that interfaces with the cartridge housing. Each of the two battery-receiving cavities is configured to receive a series of cylindrical batteries therein, the series of cylindrical batteries being configured to power one or more light sources disposed within a flashlight apparatus. In other variants, methods of installing batteries within the aforementioned battery cartridge as well as flashlights that incorporate the aforementioned battery cartridge are also disclosed.

15 Claims, 14 Drawing Sheets

Related U.S. Application Data application No. 29/685,728, filed on Mar. 29, 2019, and a continuation-in-part of application No. 29/685,721, filed on Mar. 29, 2019, and a continuation-in-part of application No. 29/697,262, filed on Jul. 5, 2019, and a continuation-in-part of application No. 29/697,658, filed on Jul. 10, 2019.

(51) Int. Cl.
| | | |
|---|---|---|
| *F21V 5/00* | (2018.01) | |
| *H01M 2/10* | (2006.01) | |
| *F21V 23/04* | (2006.01) | |
| *F21Y 115/10* | (2016.01) | |

(52) U.S. Cl.
CPC ....... *F21V 23/0421* (2013.01); *H01M 2/1055* (2013.01); *F21Y 2115/10* (2016.08); *H01M 2220/30* (2013.01)

(58) Field of Classification Search
CPC ... F21V 5/00; F21Y 2115/10; H01M 2220/30; H01M 2/1055
See application file for complete search history.

(56) References Cited

U.S. PATENT DOCUMENTS

| | | | |
|---|---|---|---|
| 5,174,649 A | 12/1992 | Alston | |
| 5,227,263 A * | 7/1993 | Blier | H01M 2/1055 |
| | | | 429/100 |
| 5,667,293 A | 9/1997 | Own | |
| 5,931,562 A | 8/1999 | Arato | |
| 5,971,562 A | 8/1999 | Yang | |
| 6,046,572 A * | 4/2000 | Matthews | F21L 4/005 |
| | | | 320/114 |
| 6,238,818 B1 * | 5/2001 | Dalton | H01M 2/105 |
| | | | 429/100 |
| 6,303,248 B1 * | 10/2001 | Peterson | H01M 2/105 |
| | | | 429/100 |
| 6,394,622 B1 | 5/2002 | Macek | |
| 6,443,594 B1 | 9/2002 | Marshall et al. | |
| 6,485,160 B1 | 11/2002 | Sommers et al. | |
| 6,773,139 B2 | 8/2004 | Sommers | |
| 6,802,622 B2 | 10/2004 | Hsien | |
| 6,841,941 B2 | 1/2005 | Kim et al. | |
| 6,851,828 B1 * | 2/2005 | Hansen | F21L 4/005 |
| | | | 362/203 |
| 7,048,408 B2 | 5/2006 | Dallas et al. | |
| 7,083,297 B2 | 8/2006 | Matthews et al. | |
| 7,091,694 B1 * | 8/2006 | Barton | H01M 2/105 |
| | | | 320/110 |
| 7,284,871 B2 | 10/2007 | Oon et al. | |
| 7,438,431 B2 | 8/2008 | Ford et al. | |
| 7,461,944 B2 | 12/2008 | Alessio | |
| 7,509,955 B2 | 3/2009 | Cole et al. | |
| 7,568,816 B2 | 8/2009 | Brass et al. | |
| 7,651,240 B2 | 1/2010 | Bayat et al. | |
| 7,690,815 B2 * | 4/2010 | Dallas | F21V 9/083 |
| | | | 362/202 |
| 7,988,318 B1 | 8/2011 | Smith et al. | |
| 8,066,402 B2 | 11/2011 | Klipstein | |
| 8,100,540 B2 | 1/2012 | Huebner | |
| 8,317,357 B2 | 11/2012 | Bayat et al. | |
| 8,388,167 B2 | 3/2013 | Klipstein et al. | |
| 8,591,077 B2 | 11/2013 | Okada et al. | |
| 8,801,233 B2 | 8/2014 | Lu | |
| 9,055,670 B2 * | 6/2015 | Su | H04M 1/0202 |
| 9,534,750 B2 | 1/2017 | Pritchett | |
| 9,562,672 B2 | 2/2017 | Jorgensen et al. | |
| 9,651,222 B2 | 5/2017 | Jorgensen | |
| 9,964,281 B2 | 5/2018 | Windom et al. | |
| 10,096,805 B1 * | 10/2018 | Lewis | H01M 2/1061 |
| 2003/0147237 A1 | 8/2003 | Halasz | |
| 2003/0189826 A1 * | 10/2003 | Yoon | F21V 29/74 |
| | | | 362/205 |
| 2004/0130891 A1 | 7/2004 | Twardawski | |
| 2004/0240201 A1 | 12/2004 | Rausseck | |
| 2005/0157492 A1 | 7/2005 | Chiu | |
| 2007/0030673 A1 * | 2/2007 | Hull | F21L 4/005 |
| | | | 362/208 |
| 2009/0040752 A1 * | 2/2009 | Dallas | H01M 2/1055 |
| | | | 362/202 |
| 2010/0177507 A1 * | 7/2010 | West | H01M 10/425 |
| | | | 362/183 |
| 2010/0259220 A1 | 10/2010 | Crawford et al. | |
| 2012/0033416 A1 * | 2/2012 | Ballard | F21L 4/027 |
| | | | 362/202 |
| 2015/0159830 A1 | 6/2015 | Joergensen | |

\* cited by examiner though their utility is most commonly used.

FLASHLIGHT APPARATUS AND BATTERY CARTRIDGE FOR THE FLASHLIGHT APPARATUS

PRIORITY

This application claims the benefit of priority to U.S. Design patent application Ser. No. 29/685,726 filed Mar. 29, 2019 and entitled "Dual Focus Lens Apparatus for Use with Flashlights", U.S. Design patent application Ser. No. 29/685,728 filed Mar. 29, 2019 and entitled "Quad Focus Lens Apparatus for Use with Flashlights", U.S. Design patent application Ser. No. 29/685,721 filed Mar. 29, 2019 and entitled "Triple Focus Lens Apparatus for Use with Flashlights", U.S. Design patent application Ser. No. 29/697,262 filed Jul. 5, 2019 and entitled "Flashlight", and U.S. Design patent application Ser. No. 29/697,658 filed Jul. 10, 2019 and entitled "Flashlight", the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure relates generally to portable lighting devices, such as hand-held flashlights, that may emit beams of various focal distances and widths dependent upon the operational mode selected for the flashlight.

2. Field of the Disclosure

Flashlights are hand-held electric devices that emit light through the use of, for example, incandescent light bulbs or one or more light-emitting diodes (LEDs). A typical flashlight consists of a light source mounted in, for example, a reflector; a transparent covering that may sometimes be combined with a lens in order to protect the light source from the external environment; one or more power sources (e.g., batteries); and a switch. Flashlights may be used in a variety of operational scenarios; however, one of their most common operating scenarios is for use as a light source when in a place with no power such as during power outages. Due to the relative infrequency of use in this common operating scenario, it is possible that the batteries in the device may be drained when the flashlight is needed. Accordingly, it would be desirable to have a flashlight where the replacement of the batteries is made easier to the user in low-light conditions. Furthermore, such a flashlight should be durable and adaptable for a variety of operating scenarios in which flashlights are commonly used.

SUMMARY

The present disclosure satisfies the foregoing needs by providing, inter alia, a flashlight in which the replacement of the batteries may be made easier, especially in low-light conditions, in which its utility is most commonly used.

In one aspect, a flashlight apparatus is disclosed. In one embodiment, the flashlight apparatus includes a lens housing having a lens disposed therein; a body housing coupled with the lens housing; and an end cap housing coupled with the body housing. The body housing has a battery cartridge disposed therein, the battery cartridge including a cartridge housing having two battery-receiving cavities disposed therein and an end cap that interfaces with the cartridge housing. Each of the two battery-receiving cavities is configured to receive a series of cylindrical batteries therein, the series of cylindrical batteries being configured to power one or more light sources disposed within the flashlight apparatus.

In one variant, the series of cylindrical batteries includes two size AAA batteries.

In another variant, the two battery-receiving cavities is configured to hold a first series of cylindrical batteries in a first orientation while a second series of cylindrical batteries is held in a second orientation, the second orientation differing from the first orientation.

In yet another variant, the cartridge housing includes a first cartridge housing and a second cartridge housing, each of the first cartridge housing and the second cartridge housing having a divider ridge disposed therein, the divider ridge for both the first cartridge housing and the second cartridge housing being configured to form the two battery-receiving cavities when assembled.

In yet another variant, the first cartridge housing and the second cartridge housing both include a plurality of reinforcement ribs disposed thereon.

In yet another variant, each of the two battery-receiving cavities includes markings, the markings being configured to distinguish between each of the two battery-receiving cavities based on a tactile feel for the two battery-receiving cavities.

In yet another variant, the end cap includes one or more one-way snaps, the one or more one-way snaps being configured to semi-permanently hold the battery cartridge within the flashlight apparatus.

In yet another variant, the flashlight apparatus further includes a reinforcement sleeve, the reinforcement sleeve including a cylindrical metallic material that is disposed between the body housing and the battery cartridge.

In yet another variant, the one or more light sources includes one or more light-emitting diodes, the one or more light-emitting diodes being powered through the use of switch circuitry located at an end of the flashlight apparatus that is disposed opposite from the lens housing, the switch circuitry configured to enable the passage of current through the series of cylindrical batteries which powers the one or more light-emitting diodes.

In yet another variant, the lens includes a dual-focus lens.

In yet another variant, the lens includes a tri-focus lens.

In yet another variant, the lens includes a quad-focus lens.

In another aspect, a battery cartridge for use with the aforementioned flashlight apparatus is disclosed. In one embodiment, the battery cartridge includes a cartridge housing having two battery-receiving cavities disposed therein and an end cap that interfaces with the cartridge housing. Each of the two battery-receiving cavities is configured to receive a series of cylindrical batteries therein, the series of cylindrical batteries being configured to power one or more light sources disposed within a flashlight apparatus.

In one variant, the series of cylindrical batteries includes two size AAA batteries. In another variant, the two battery-receiving cavities is configured to hold a first series of cylindrical batteries in a first orientation while a second series of cylindrical batteries is held in a second orientation, the second orientation differing from the first orientation.

In yet another variant, the cartridge housing includes a first cartridge housing and a second cartridge housing, each of the first cartridge housing and the second cartridge housing having a divider ridge disposed therein, the divider ridge for both the first cartridge housing and the second cartridge housing being configured to form the two battery-receiving cavities when assembled.

In yet another variant, the first cartridge housing and the second cartridge housing both include a plurality of reinforcement ribs disposed thereon.

In yet another variant, each of the two battery-receiving cavities includes markings, the markings being configured to distinguish between each of the two battery-receiving cavities based on a tactile feel for the two battery-receiving cavities.

In yet another variant, the end cap includes one or more one-way snaps, the one or more one-way snaps being configured to semi-permanently hold the battery cartridge within a flashlight.

In yet another aspect, a lens for use with the aforementioned flashlight is disclosed. In one embodiment, the lens for use with the aforementioned flashlight includes a dual-focus lens.

In another embodiment, the lens for use with the aforementioned flashlight includes a quad-focus lens.

In yet another embodiment, the lens for use with the aforementioned flashlight includes a tri-focus lens.

In yet another aspect, methods of manufacturing the aforementioned apparatus are disclosed.

In yet another aspect, methods of using the aforementioned apparatus are disclosed. In one embodiment, the method includes a method of installing a plurality of cylindrical batteries into a flashlight apparatus, the method including: removing an end cap housing from the flashlight apparatus; inserting a first battery into a first battery receiving cavity in a first orientation; inserting a second battery into the first battery receiving cavity in the first orientation; inserting a third battery into a second battery receiving cavity in a second orientation that differs from the first orientation; inserting a fourth battery into the second battery receiving cavity in the second orientation; and installing the end cap housing onto the flashlight apparatus.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the present disclosure will become more apparent from the detailed description set forth below when taken in conjunction with the drawings, wherein.

All Figures disclosed herein are © Copyright 2019 Technomate Manufactory Limited. All rights reserved.

DETAILED DESCRIPTION

Exemplary Embodiments

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of the disclosed apparatus (or methods) for purposes of illustration only. One skilled in the art will readily recognize from the following description that alternative embodiments of the structures and methods illustrated herein may be employed without necessarily departing from the principles described herein.

While primarily discussed in the context of hand-held lighting devices, it would be readily apparent to one of ordinary skill given the contents of the present disclosure that the principles described herein may have broader utility outside of hand-held lighting devices. For example, the principles of the present disclosure may be readily applied to other lighting devices, such as for example, head-mounted (e.g., so-called headlamps), helmet-mounted flashlights, keychain flashlights, tactical (weapon-mounted) flashlights, and bicycle headlamps. These and other variants would be readily apparent to one of ordinary skill given the contents of the present disclosure.

Exemplary Flashlight Apparatus—

Figure 1A:
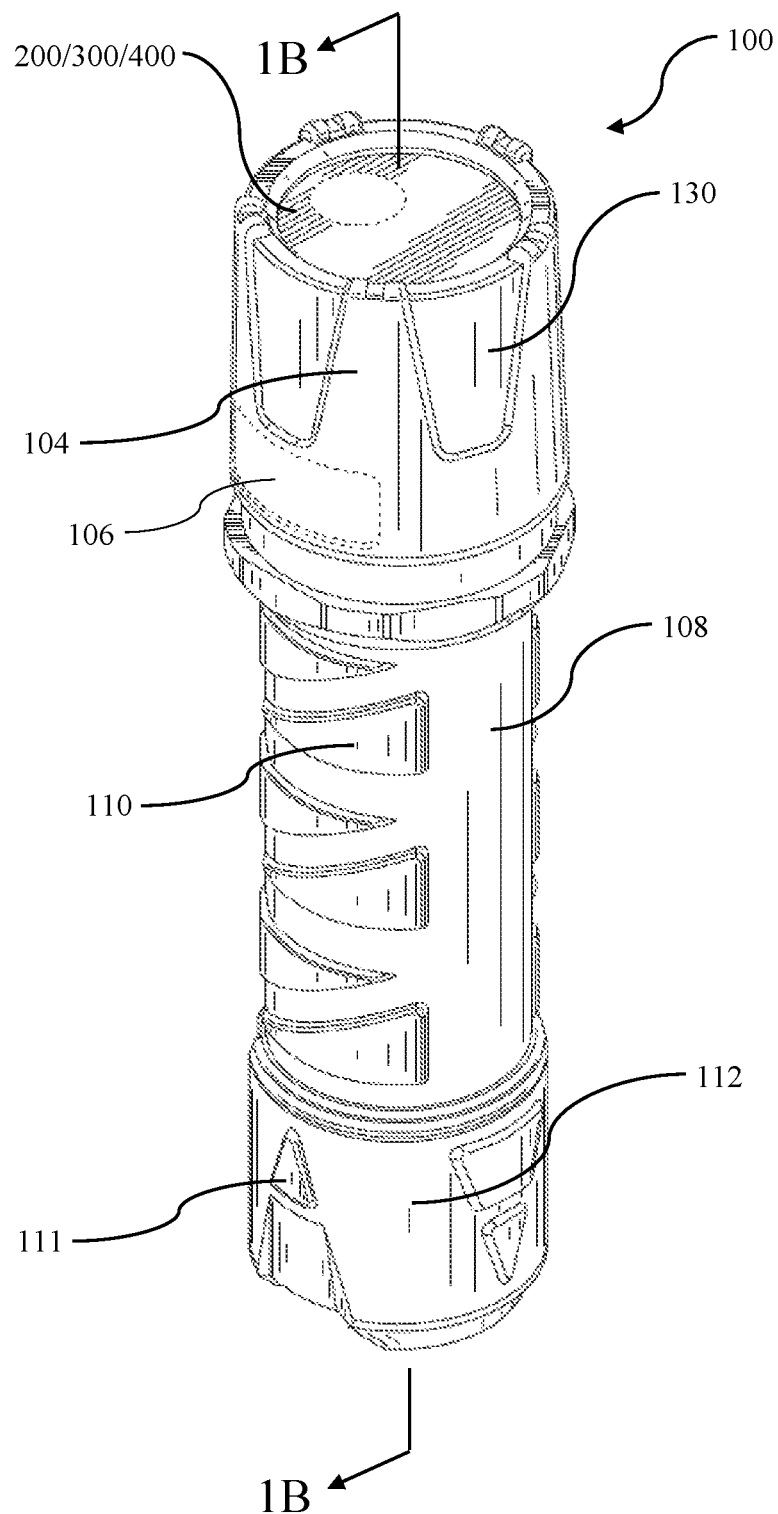
FIG. 1A is a perspective view of a flashlight apparatus, in accordance with the principles of the present disclosure.

Referring now to FIG. 1A, an exemplary flashlight apparatus 100 is shown and described in detail. The flashlight apparatus 100 of FIG. 1A includes a lens housing 130, a body housing 108 and an end cap housing 112. In some implementations, the end cap housing 112 is configured to be removable from the body housing 108. The end cap housing 112 may be removable by rotating the end cap housing 112 with respect to the body housing 108 (e.g., by rotating the end cap housing 112 counterclockwise (or clockwise), with respect to the body housing 108). In some variants, the end cap housing 112 may be removable via the activation of a button or lock located on either the end cap housing 112 or the body housing 108. The end cap housing 112 may be sized so as to distinguish it from the body housing 108, especially in situations in which the user cannot see the features of the flashlight 100 (e.g., during low-light conditions). For example, as illustrated in FIG. 1A, the end cap housing 112 may have a larger diameter than the body housing 108 and may include identifying features 111 (e.g., triangles that are oriented distinctly from the grips 110) that distinguish the end cap housing 112 from the body housing 108 based on tactile sensations, in order to facilitate the end cap housing's 112 removal from the body housing 108 in low-light conditions.

In some implementations, the lens housing 130 may be removable from the body housing via similar attachment mechanisms as was previously discussed with respect to the end cap housing 112. However, in some implementations the lens housing 130 may be attached to the body housing 108 through semi-permanent attachment means such as, for example, via use of a one-way cantilever snap, the use of one-way attachment screws, heat-staking, or any other attachment means by which the lens housing 130 is meant to be secured to the body housing 108, but otherwise not meant to be removed once installed. In such implementations, the semi-permanent attachment of the lens housing 130 to the body housing 108 is configured to, inter alia, protect the underlying circuitry and light sources present within the lens housing 130.

The lens housing 130 is configured to position a lens 200, 300, 400 such as those discussed subsequently herein with respect to FIGS. 2A-4C, therein. The lens 200, 300, 400 may consist of a dual-focus lens 200 which is configured to shape the light beams illuminated by a respective light source into a focused beam and a flood beam, into two focused beams, or into two flood beams. As used herein, the terms "focused" and "flood" refer to the shaping of light with respect to one another. For example, a focused beam has a narrower light beam than a flood beam, while the flood beam has a wider light beam than a focused beam. The lens 200, 300, 400 may also consist of a quad-focus lens 300 which is configured to shape the light beams illuminated by a respective light source into two focused beams and two flood beams, three focused beams and one flood beam, three flood beams and one focused beam, four focused beams, or four flood beams. The lens 200, 300, 400 may also consist of a tri-focus lens 400 which is configured to shape the light beams illuminated by a respective light source into a focused beam and two flood beams, into a flood beam and two focused beams, into three focused beams, or into three flood beams. In some implementations, the lens 200, 300, 400 may consist of a unitary lens that is configured to shape the light beam illuminated by a light source (or light sources) into a focused and/or a flood beam. In instances in which the unitary lens is configured to produce both a focused and a flood beam, the result may be achieved through the ability to alter the focal point of the lens 200, 300, 400 (e.g., through the rotating of the lens housing 130 with respect to the body housing 108, etc.). The lens 200, 300, 400 may also consist of five (5) or more distinctive lens' having a variety of focused and/or flood-based beams when illuminated.

The lens housing 130 may include one or more lens protecting features 104. In the illustrated embodiment, the lens housing 130 includes five (5) lens protecting features 104 which are positioned around the lens 200, 300, 400 so as to protect the lens 200, 300, 400 when the flashlight apparatus 100 is, for example, dropped onto the ground. The purpose of these lens protecting features 104 is to absorb the energy experienced upon impact and to otherwise protect the lens 200, 300, 400 from being cracked or shattered upon impact with an external object. For example, as illustrated, the lens protecting features 104 are wider in dimension towards the body housing 108 portion of the flashlight apparatus 100 as compared with the portion of the lens protecting feature 104 located adjacent the lens 200, 300, 400. Additionally, in the illustrated embodiment, each lens protecting feature 104 includes two protrusions at the top of the flashlight apparatus 100 which is configured to help dissipate energy upon impact away from the lens 200, 300, 400. However, while a specific configuration is shown in FIG. 1A, it would be readily appreciated by one of ordinary skill in the art given the contents of the present disclosure that the number (or even shape) of these lens protecting features 104 may be altered in some implementations. For example, the shape and/or the number of the protrusions at the top portion of each lens protecting feature may be altered from that shown in some implementations.

The lens housing 130 may also include an identifier portion 106 which may be utilized to identify a brand, manufacturing information (e.g., date and location of manufacture), as well as any other information that assists with the marketing and/or deployment of the flashlight apparatus within the market. For example, the identifier portion may include a trademark (e.g., Duracell®) that identifies the source (or sponsored source) of the goods as well as a model number for the flashlight 100.

The body housing 108 may include one or more grips 110 that facilitates the handling of the flashlight apparatus 100 and prevents undesirable slippage, especially in, for example, low-light or wet conditions. For example, as illustrated in FIG. 1A, the grips 110 consist of a number of right-angled triangles that alternate orientations as you advance down (or up) the body housing 108. This series of right-angled triangles may be present on one or more other portions of the body housing 108. For example, as illustrated, one series of grips 110 is located 180° degrees from another series of grips 110 located on the body housing 108. However, it would be appreciated that in some implementations, three series of grips may be located 120° degrees from one another on the body housing 108; or four series of grips may be located 90° degrees from one another on the body housing 108. These and other variants would be readily apparent to one of ordinary skill given the contents of the present disclosure. For example, the grips 110 may consist of a series of bumps and/or ridges that facilitates the gripping of the flashlight apparatus 100.

Figure 1B:
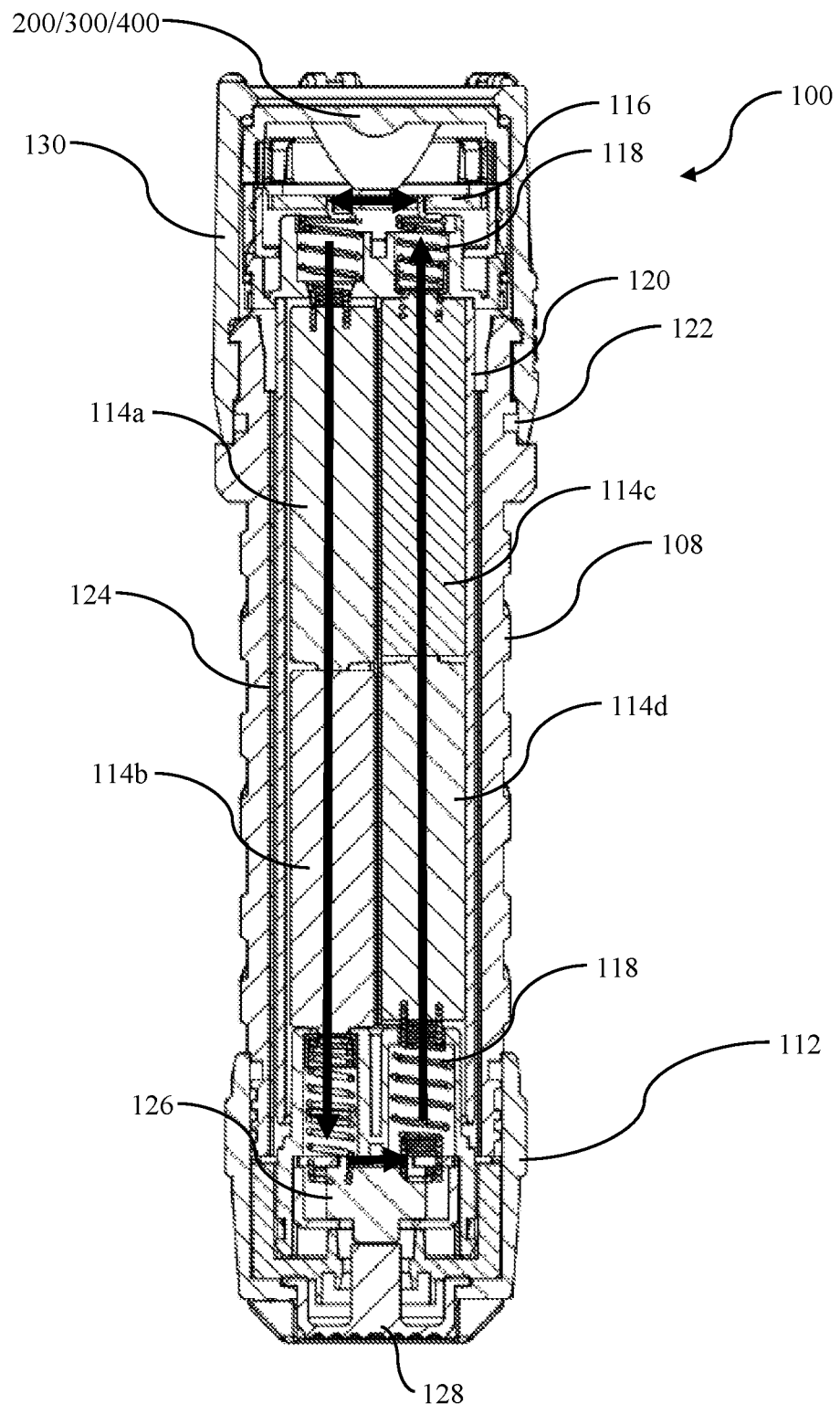
FIG. 1B is a cross-sectional view of the flashlight apparatus of FIG. 1A, in accordance with the principles of the present disclosure.

Referring now to FIG. 1B, a cross-sectional view of the flashlight apparatus 100 is shown and described in detail. The flashlight apparatus 100 includes a battery cartridge 120 that is configured to hold two columns of cylindrical batteries 114. In some implementations, the cylindrical batteries 114 include size AAA batteries, although it would be appreciated that batteries of other sizes (e.g., AA, AAAA, C, D, etc.) and ratings may be readily substituted in appropriate implementations. The battery cartridge 120 is advantageously not intended to be removed from the flashlight apparatus 100 and is intended to facilitate the insertion or removal of the cylindrical batteries 114 from the flashlight apparatus 100. One of the battery columns located within the battery cartridge 120 is intended to hold a series of batteries 114a, 114b (e.g., a series of two batteries 114) with the positive terminals of these batteries 114a, 114b oriented towards the end cap housing 112, and with the other one of the battery columns within the battery cartridge 120 intended to hold a series of batteries 114c, 114d in an opposite orientation. The current generated from these batteries is intended to go directly through these two lines (or series) of batteries 114. In some implementations, three (3) (or more) distinct series of batteries may be included with the flashlight apparatus 100. Located on opposing ends of these series of batteries 114 are conductive compression springs 118 that facilitate current transfer to the switch circuitry 126 as well as to the light source(s) located on the substrate 116. The battery cartridge 120 will be described in subsequent detail herein with respect to FIGS. 1C-1E.

The body housing 108 may be manufactured from a durable polyresin-based material, although it would be appreciated that other suitable polymer and even metallic materials may be readily substituted in some implementations. The body housing 108 may also include a reinforcement sleeve 124 made from metallic materials such as, for example, stainless steel which protects against damage and may also be utilized to weatherproof the internal electronic components. The body housing 108 may interface with the lens housing using the aforementioned one-way cantilever snap(s) 122. These cantilever snap(s) 122 may enable the lens housing 130 to be "snapped" onto the body housing 108. In some implementations, the lens housing 130, once installed onto the body housing 108, is not intended to be removable so as to, inter alia, protect the underlying substrate and accompanying light source(s). However, in some implementations it may be desirable to utilize threads on the lens housing 130 and the body housing 108, respectively, in order to allow the lens housing 130 to be separated from the body housing 108. Such an implementation may be desirable in order to enable, inter alia, the lens 200, 300, 400 (and substrate 116) to be swapped out. For example, the lens 200 of FIGS. 2A-2C may be replaced with the lens 300 of FIGS. 3A-3C or the lens 400 of FIGS. 4A-4C, and vice versa.

The end cap housing 112 may include a toggle button 128 that is configured to interface with the switch circuitry 126. For example, depressing the toggle button 128 once may enable a first type of functionality, while depressing the toggle button 128 twice may enable a second type of functionality. Additional depressing of the toggle button 128 may enable further functionality and may even inactivate the light sources located within the lens housing 130. In one implementation, the flashlight apparatus 100 may include the dual focus lens 200 of FIGS. 2A-2C. Using such an implementation, a first press of the toggle button 128 (while in an inactive state) may cause the spot beam and the flood beam to simultaneously turn on resulting in a higher intensity beam of light. A second press of the toggle button 128 may cause the flood beam light source to turn off, while the spot beam remains on. A third press of the toggle button 128 may cause the spot beam light source to turn off, while turning on the flood beam light source. A fourth press of the toggle button may cause the spot beam (and/or the flood beam) light source to flash on and off. A fifth press of the toggle button may turn off both the spot beam and the flood beam. These and other variants would be readily apparent to one of ordinary skill given the contents of the present disclosure.

Figure 1C:
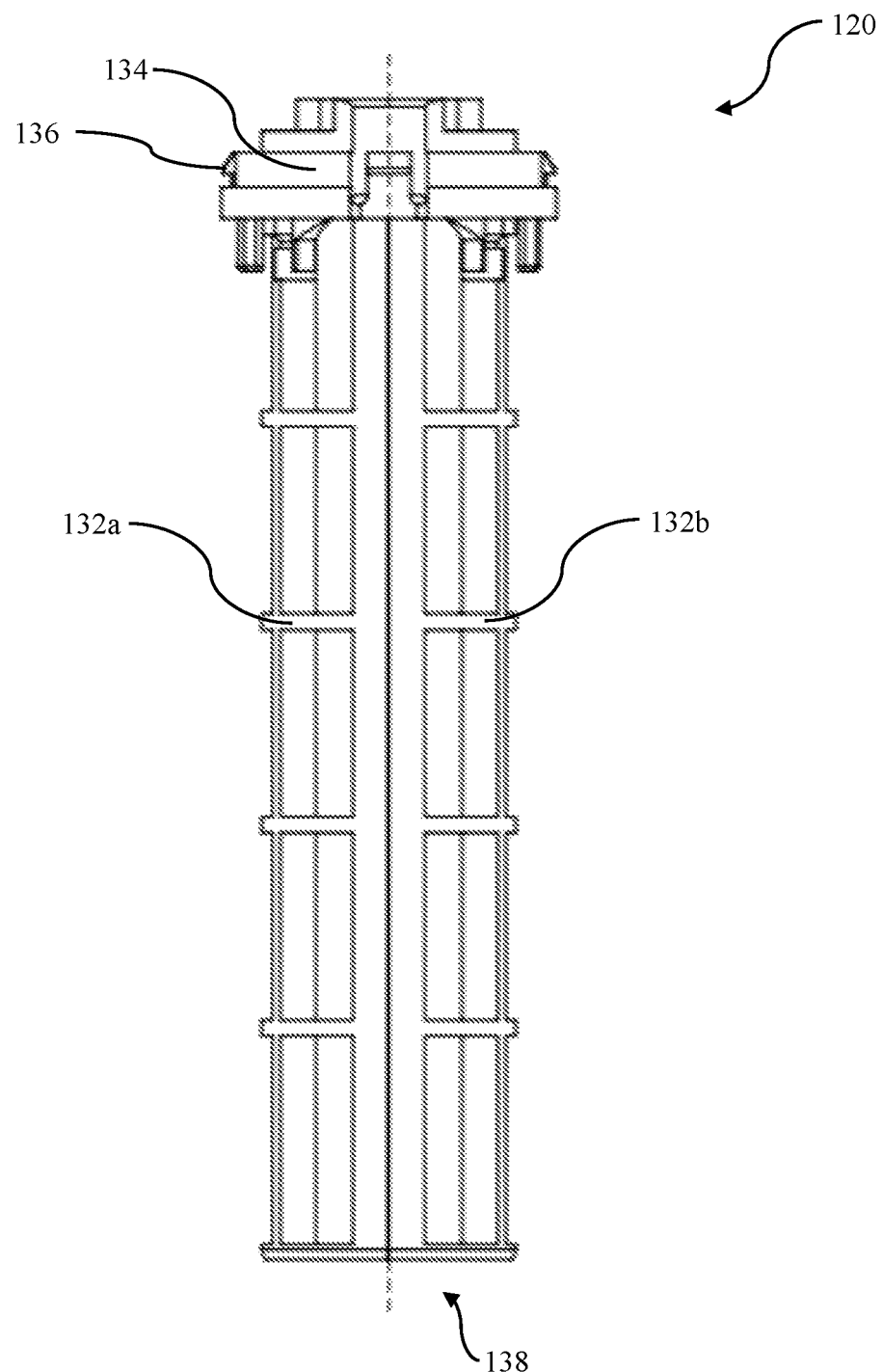
FIG. 1C is a front elevation view of a battery cartridge for use with the flashlight apparatus of FIG. 1A, in accordance with the principles of the present disclosure.
Figure 1D:
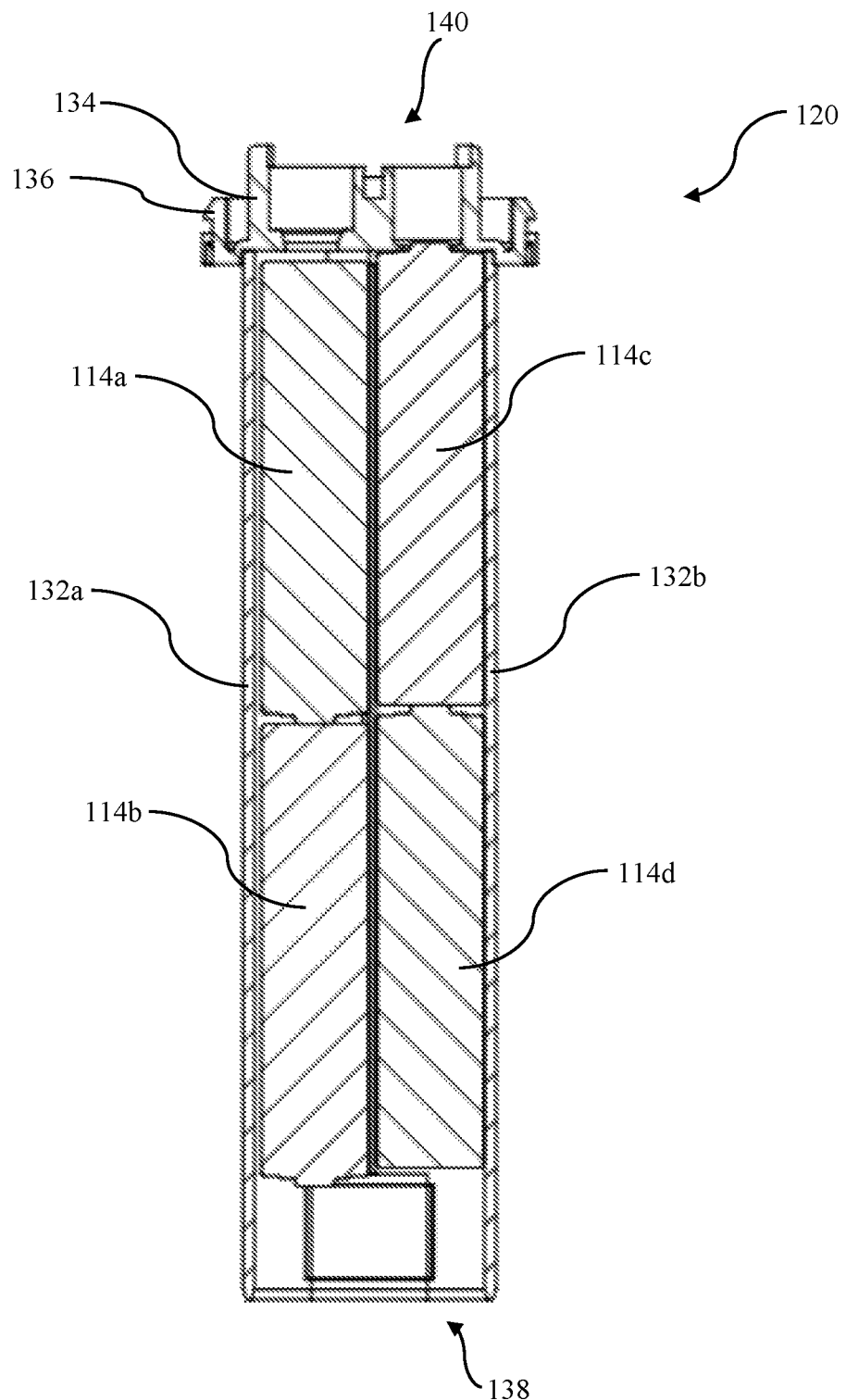
FIG. 1D is a cross-sectional view of the battery cartridge of FIG. 1C, in accordance with the principles of the present disclosure.
Figure 1E:
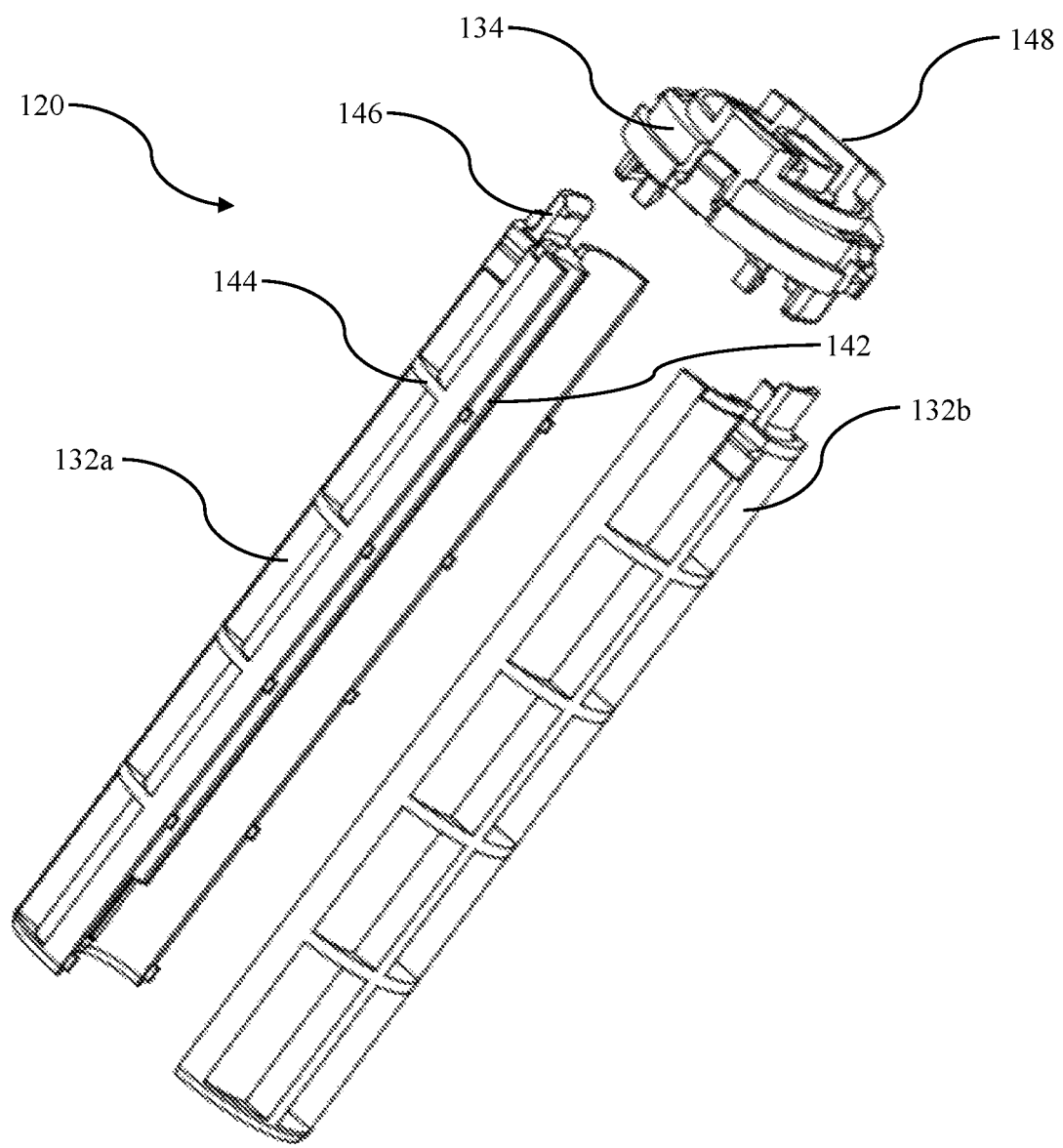
FIG. 1E is an exploded perspective view of the battery cartridge of FIG. 1C, in accordance with the principles of the present disclosure.

Referring now to FIGS. 1C-1E, an exemplary implementation of the battery cartridge 120 for use with, for example, the flashlight apparatus 100 of FIG. 1A is shown and described in detail. The battery cartridge 120 may consist of three distinct elements: (1) an end cap 134; (2) a first cartridge housing 132a; and (3) a second cartridge housing 132b. On the opposing side of the battery cartridge 120 from the end cap 134, resides the battery insertion end 138 of the battery cartridge 120. Near the battery insertion end 138, markings may be present on the cartridge housing 132 that indicates to a user, the proper orientation of the batteries 114. Advantageously, the markings may be distinguished via touch, thereby enabling one to swap out the batteries even under low light conditions and without requiring vision in order to complete the battery swap procedure. Such an implementation may be especially useful as flashlights often find there most utility in low light conditions (e.g., during a power outage, etc.).

Referring now to the cross-sectional view of the battery cartridge 120 shown in FIG. 1D, the end cap 134 includes two (or more) compression spring apertures 140. These compression spring apertures 140 enable the conductive compression springs (118, FIG. 1B) to transfer current between the batteries 114 and the light source circuitry located within the lens housing (130, FIG. 1B). As again shown in FIG. 1D, one series of batteries 114a, 114b is oriented in one direction, while the second series of batteries 114c, 114d is oriented in a direction opposite from the direction of the first series of batteries 114a, 114b.

FIG. 1E illustrates an exploded view of one embodiment of the battery cartridge 120 as illustrated in FIGS. 1B-1D. The battery cartridge 120 includes a first cartridge housing 132a and a second cartridge housing 132b. Each of the first cartridge housing 132a and the second cartridge housing 132b includes a divider ridge 142 such that when the first cartridge housing 132a and the second cartridge housing 132b are mated together, two battery-receiving cavities are formed within the battery cartridge 120. The first cartridge housing 132a and the second cartridge housing 132b may be manufactured from an injection-molded polymer and each may also include a plurality of reinforcement ribs 144 in order to provide increased rigidity for the battery cartridge 120 as compared with a similar battery cartridge 120 that doesn't include the reinforcement ribs 144. In the illustrated embodiment, the number of reinforcement ribs 144 included on each of the first cartridge housing 132a and the second cartridge housing 132b is four (4), although fewer (or more) reinforcement ribs 144 may be included in other suitable alternative battery cartridge 120 structures. The reinforcement ribs 144 in combination with the reinforcement sleeve (124, FIG. 1B) and body housing (108, FIGS. 1A and 1B) may provide for increased rigidity and durability for the flashlight apparatus 100. The cartridge housings 132 each may include a cantilever snap 146. The cantilever snaps 146 are configured to interface with the end cap 134 such that these three (3) components may be mechanically assembled forming a unitary battery cartridge 120. The end cap 134 may also include a substrate mating surface 148 which provides a supporting surface for the light source(s) and substrate circuitry.

Exemplary Lens Apparatus for Use with the Flashlight Apparatus—

Figure 2A:
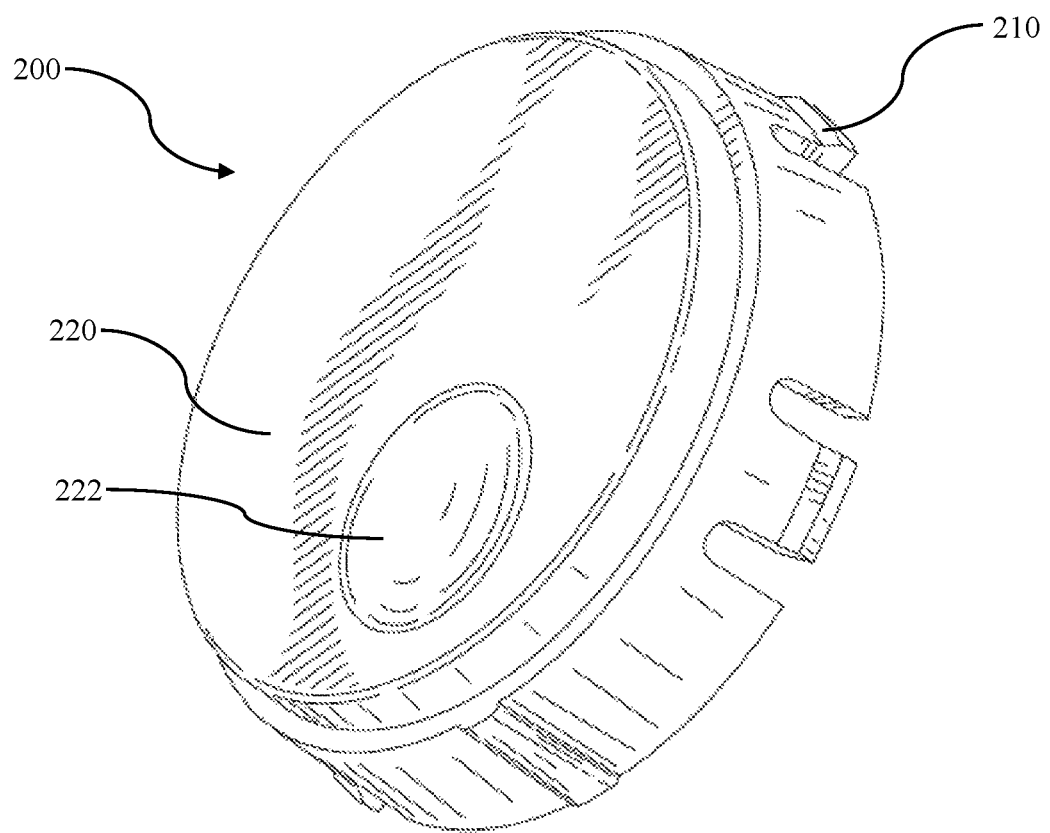
FIG. 2A is a perspective view of one exemplary lens for use with the flashlight apparatus of FIG. 1A, in accordance with the principles of the present disclosure.
Figure 2B:
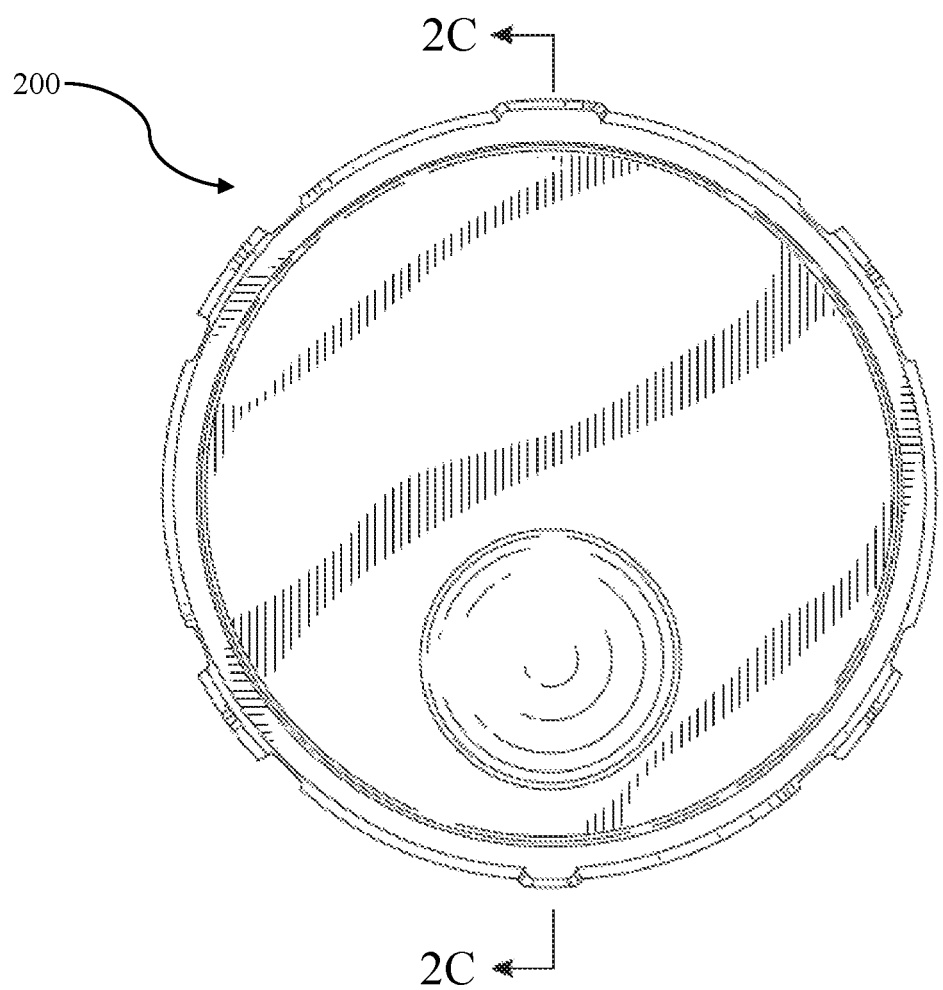
FIG. 2B is a front elevation view of the lens of FIG. 2A, in accordance with the principles of the present disclosure.
Figure 2C:
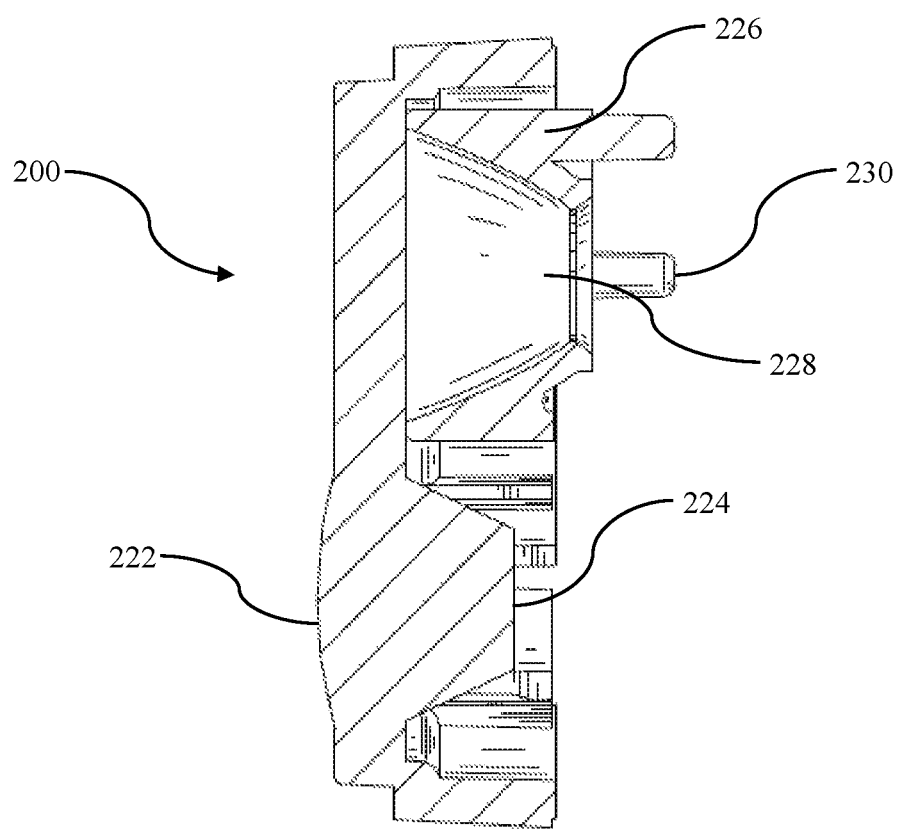
FIG. 2C is a cross-sectional view of the lens of FIG. 2A, in accordance with the principles of the present disclosure.

Referring now to FIGS. 2A-2C, a perspective view of one exemplary lens 200 for use with, for example, the flashlight apparatus 100 of FIG. 1A. The lens 200 depicted in FIGS. 2A-2C is a so-called dual focus lens which is configured to generate a focused beam and a flood beam that emanates light from the lens cover surface 220, when activated. The lens 200 may include one or more cantilever snaps 210 that may be utilized to facilitate the lens's 200 insertion into, for example, the flashlight apparatus 100. As can be seen in FIG. 2C, the dual-focus lens 200 includes a first lens having a convex surface 222 and a light-source ingress surface 224, which collectively are configured to generate a flood beam when one or more light sources illuminate this portion of the lens 200. The dual-focus lens 200 also includes a reflector component 226 which is configured to, when illuminated by one or more light sources, generate a spot beam. The reflector component 226 may be manufactured from an injection-molded polymer that is subsequently coated with a reflective (e.g., metallized) surface. In some implementations, the reflector component 226 may instead be manufactured from a reflective (e.g., polished) metal such as stainless steel, aluminum and/or other suitable metal materials. The reflector component 226 may also be manufactured separate and apart from the underlying dual focus-lens 200 and may also include one or more posts 230 that are configured to be received within, for example, the substrate such that one or more light sources are received within the reflector cavity 228 appropriately.

Figure 3A:
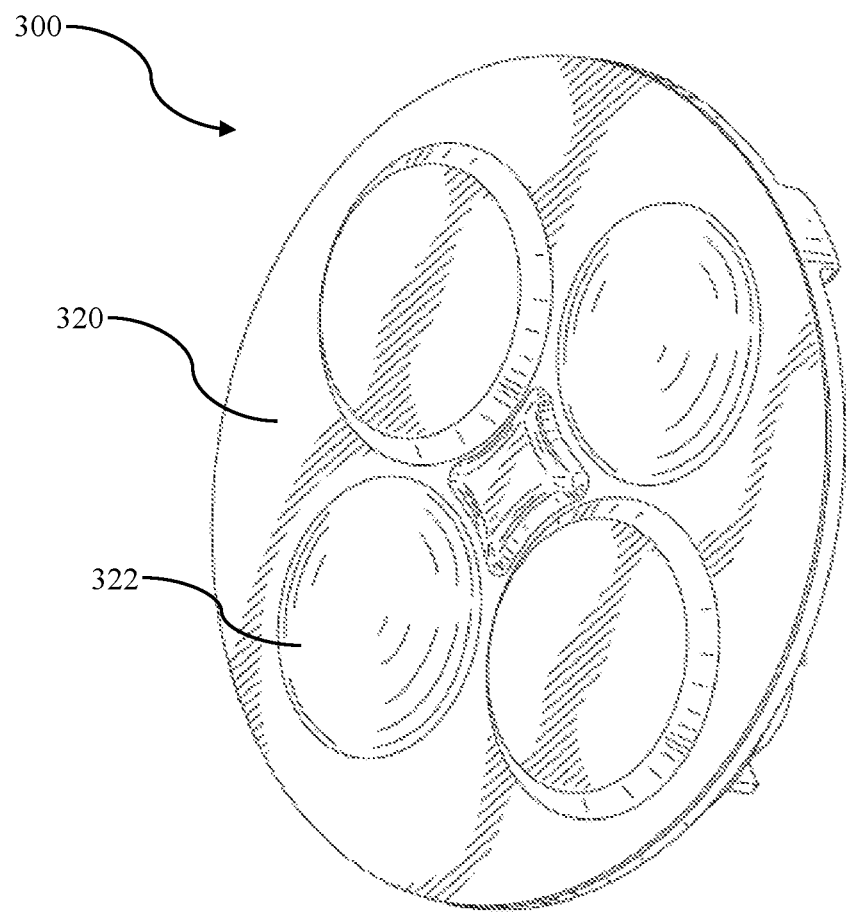
FIG. 3A is a perspective view of another exemplary lens for use with the flashlight apparatus of FIG. 1A, in accordance with the principles of the present disclosure.
Figure 3B:
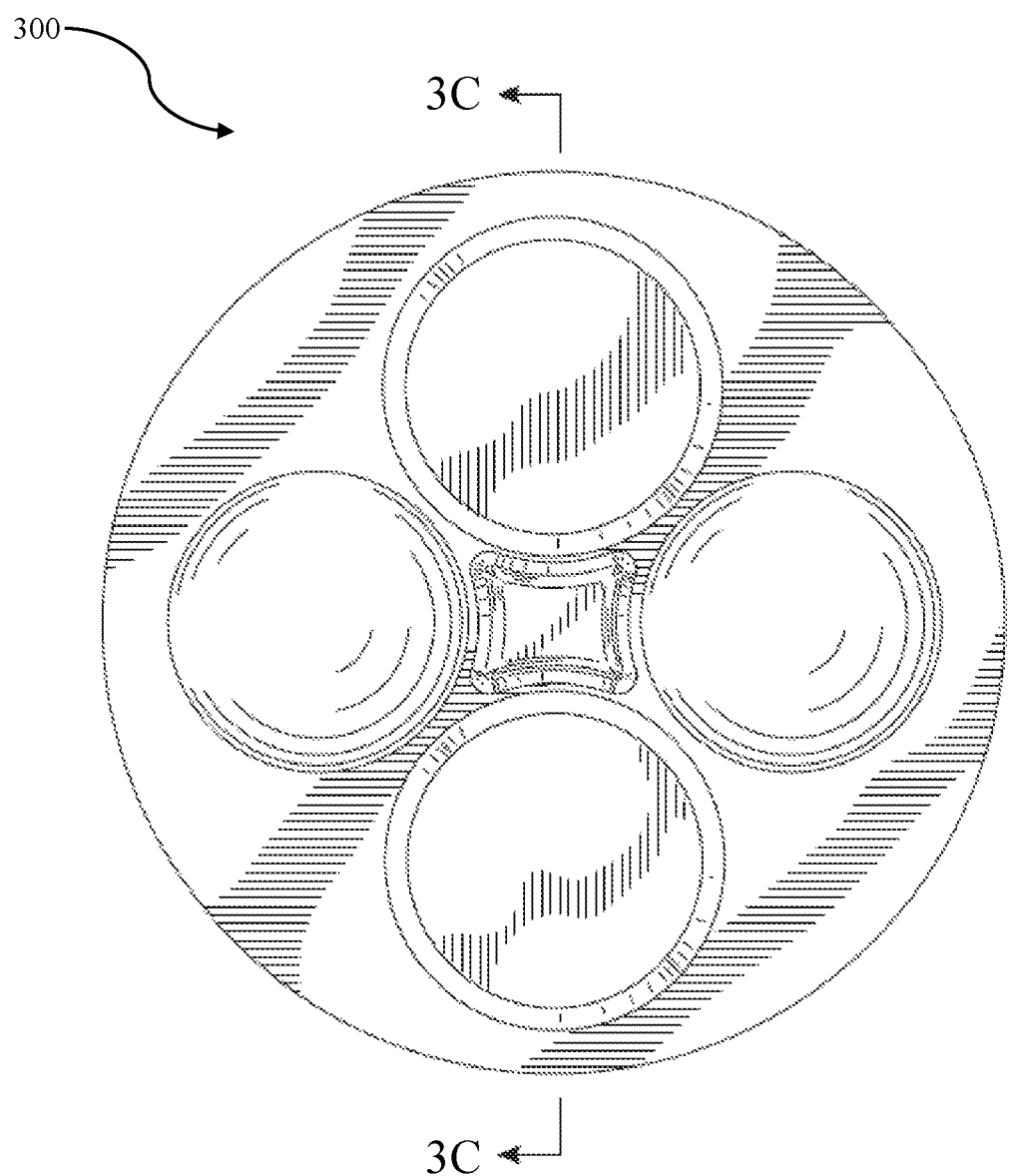
FIG. 3B is a front elevation view of the lens of FIG. 3A, in accordance with the principles of the present disclosure.
Figure 3C:
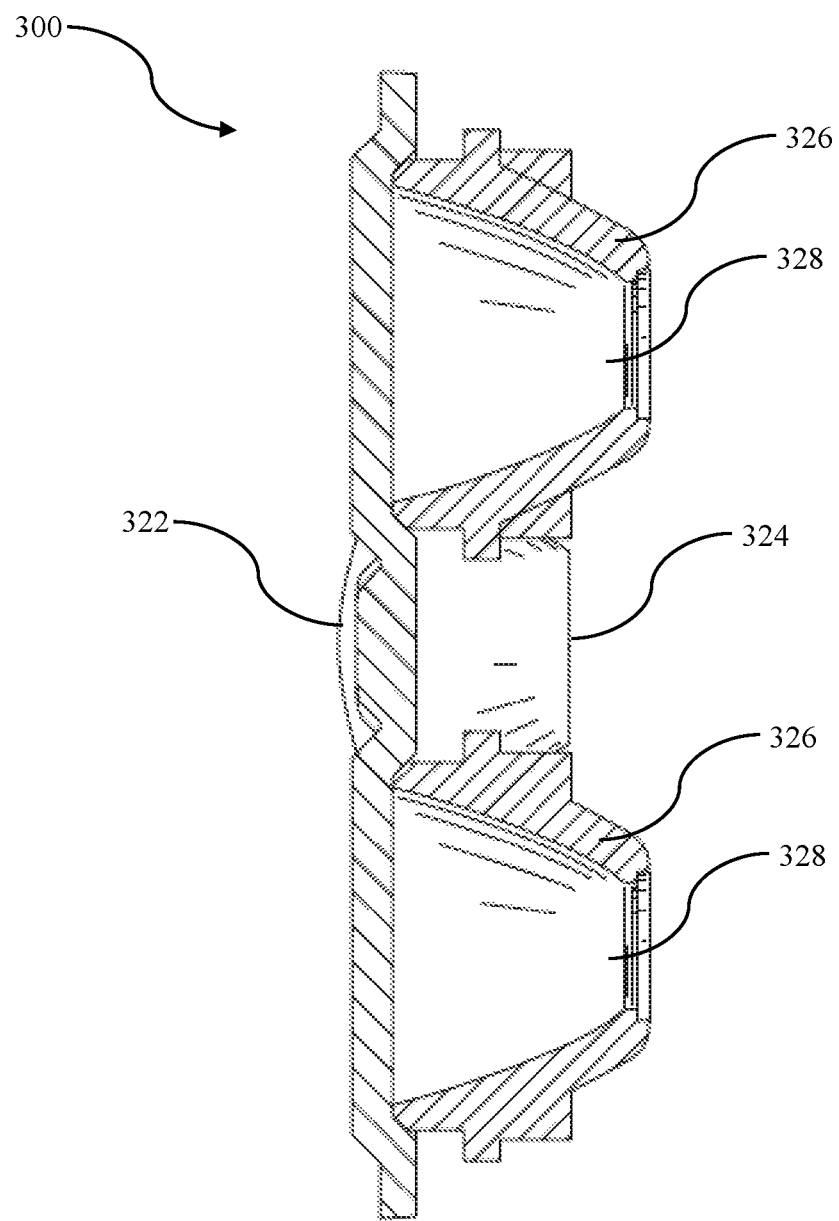
FIG. 3C is a cross-sectional view of the lens of FIG. 3A, in accordance with the principles of the present disclosure.

Referring now to FIGS. 3A-3C, a perspective view of another exemplary lens 300 for use with, for example, the flashlight apparatus 100 of FIG. 1A. The lens 300 depicted in FIGS. 3A-3C is a so-called quad focus lens which is configured to generate two focused beams and two flood beams that emanates from the lens cover surface 320, when the light sources are illuminated. The lens 300 may include one or more cantilever snaps that may be utilized to facilitate the lens's 300 insertion into, for example, the flashlight apparatus 100. As can be seen in FIG. 3C, the quad-focus lens 300 includes a first lens having a convex surface 322 and a light-source ingress surface 324, which collectively are configured to generate a flood beam when one or more light sources illuminate this portion of the lens 300. A second lens, that is similar to the first lens, is also present within the quad-focus lens 300. The quad-focus lens 300 also includes two reflector components 326 which are configured to, when illuminated by one or more light sources, generates two spot beams. The reflector components 326 may be manufactured from an injection-molded polymer that is subsequently coated with a reflective (e.g., metallized) surface. In some implementations, the reflector components 326 may instead be manufactured from a reflective (e.g., polished) metal such as stainless steel, aluminum and/or other suitable metal materials. The reflector component 326 may also be manufactured separate and apart from the underlying quad focus-lens 300 and may also include one or more posts that are configured to be received within, for example, the substrate such that one or more light sources are received within the respective reflector cavities 328.

Figure 4A:
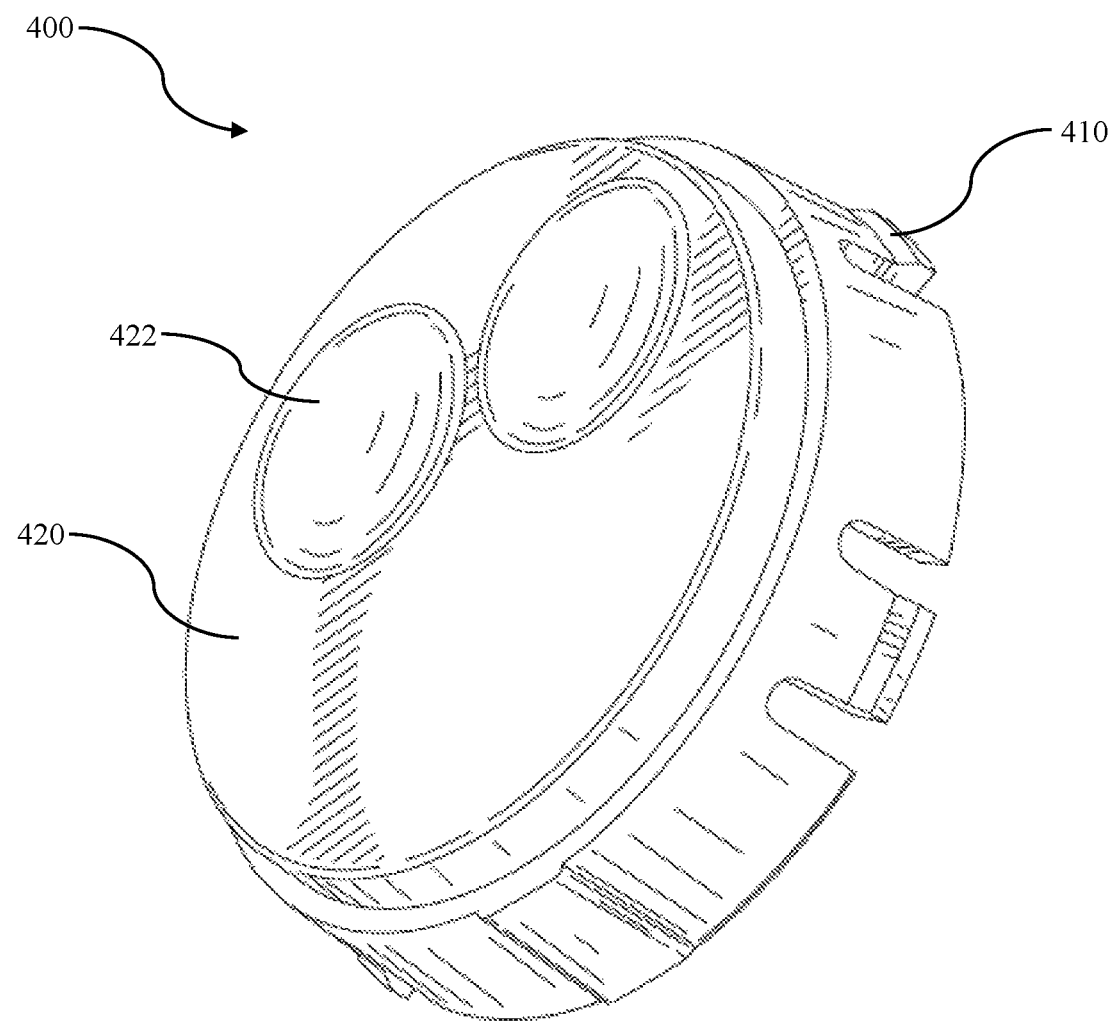
FIG. 4A is a perspective view of yet another exemplary lens for use with the flashlight apparatus of FIG. 1A, in accordance with the principles of the present disclosure.
Figure 4B:
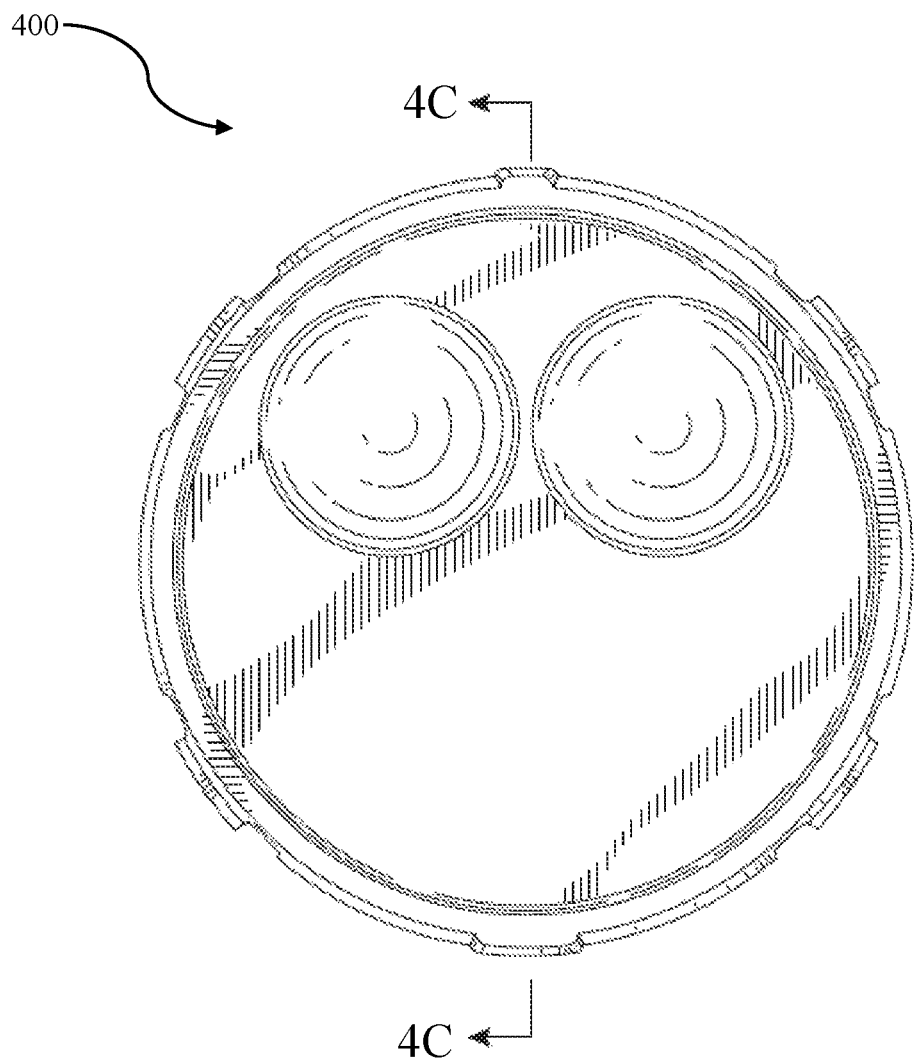
FIG. 4B is a front elevation view of the lens of FIG. 4A, in accordance with the principles of the present disclosure.
Figure 4C:
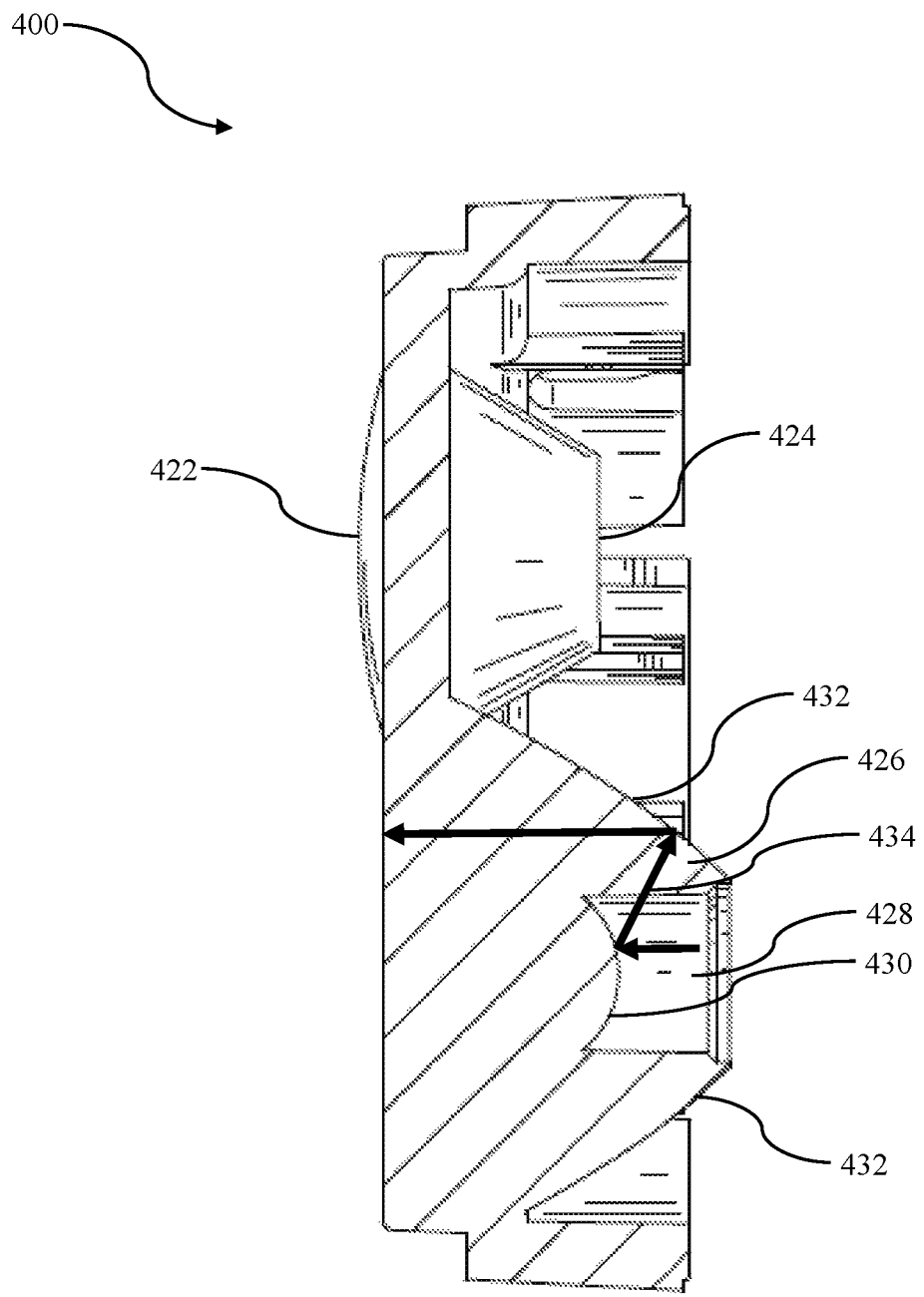
FIG. 4C is a cross-sectional view of the lens of FIG. 4A, in accordance with the principles of the present disclosure.

Referring now to FIGS. 4A-4C, a perspective view of another exemplary lens 400 for use with, for example, the flashlight apparatus 100 of FIG. 1A. The lens 400 depicted in FIGS. 4A-4C is a so-called tri-focus lens which is configured to generate a focused beam and two flood beams that emanates from the lens cover surface 420, when the light sources are illuminated. The lens 400 may include one or more cantilever snaps 410 that may be utilized to facilitate the lens's 400 insertion into, for example, the flashlight apparatus 100. As can be seen in FIG. 4C, the tri-focus lens 400 includes a first lens having a convex surface 422 and a light-source ingress surface 424, which collectively are configured to generate a flood beam when one or more light sources illuminate this portion of the lens 400. A second lens, that is similar to the first lens, is also present within the tri-focus lens 400. The tri-focus lens 400 also includes a reflector component 426 which is configured to, when illuminated by one or more light sources, generate a spot beam. The reflector component 426, unlike the reflector components illustrated in FIGS. 2A-3C, is manufactured as part of the underlying lens 400. The reflector component 426 includes a reflector cavity 428 that is configured to receive one or more light sources. The light 434 emanated from the one or more light sources is configured to reflect off of the convex surface 430 and off of the exterior surface 432 of the reflector component 426. The reflector component 426 may be manufactured from an injection-molded polymer that is subsequently coated with a reflective (e.g., metallized) surface on the convex surface 430 and/or the exterior surface 432. While specific implementations of the lens' 200, 300, 400 are shown in FIGS. 2A-4C, it would be readily apparent to one of ordinary skill given the contents of the present disclosure that individual components shown within respective lens' 200, 300, 400 may be readily substituted with other ones of the lens' 200, 300, 400. These and other variants are envisioned as, for example, described elsewhere herein.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A battery cartridge, the battery cartridge comprising:
   a cartridge housing comprising two battery-receiving cavities disposed therein, the two battery-receiving cavities being configured to hold a first series of cylindrical batteries in a first orientation while a second series of cylindrical batteries is held in a second orientation, the second orientation differing from the first orientation, the cartridge housing further comprising a first cartridge housing and a second cartridge housing, each of the first cartridge housing and the second cartridge housing comprising a divider ridge disposed therein, the divider ridge for both the first cartridge housing and the second cartridge housing being configured to form the two battery-receiving cavities when assembled; and
   an end cap that interfaces with the cartridge housing;
   wherein the first series of cylindrical batteries and the second series of cylindrical batteries are configured to power one or more light sources disposed within a flashlight apparatus.

2. The battery cartridge of claim 1, wherein each of the first series of cylindrical batteries and the second series of cylindrical batteries are sized so as to accommodate two size AAA batteries.

3. The battery cartridge of claim 1, wherein the first cartridge housing and the second cartridge housing both collectively comprise a plurality of reinforcement ribs disposed thereon.

4. The battery cartridge of claim 1, wherein each of the two battery-receiving cavities comprises markings, the markings being configured to distinguish between each of the two battery-receiving cavities based on a tactile feel for the two battery-receiving cavities.

5. The battery cartridge of claim 1, wherein the end cap comprises one or more one-way snaps, the one or more one-way snaps being configured to semi-permanently hold the battery cartridge within a flashlight.

6. A flashlight apparatus, the flashlight apparatus comprising:
   a lens housing having a lens disposed therein;
   a body housing coupled with the lens housing; and
   an end cap housing coupled with the body housing;
   wherein at least the body housing has a battery cartridge disposed therein, the battery cartridge comprising:
      a cartridge housing comprising two battery-receiving cavities disposed therein, the two battery-receiving cavities being configured to hold a first series of cylindrical batteries in a first orientation while a second series of cylindrical batteries is held in a second orientation, the second orientation differing from the first orientation, the cartridge housing further comprising a first cartridge housing and a second cartridge housing, each of the first cartridge housing and the second cartridge housing comprising a divider ridge disposed therein, the divider ridge for both the first cartridge housing and the second cartridge housing being configured to form the two battery-receiving cavities when assembled; and
      an end cap that interfaces with the cartridge housing;
      wherein the first series of cylindrical batteries and the second series of cylindrical batteries are configured to power one or more light sources disposed within the flashlight apparatus.

7. The flashlight apparatus of claim 6, wherein each of the first series of cylindrical batteries and the second series of cylindrical batteries are sized to accommodate two size AAA batteries.

8. The flashlight apparatus of claim 6, wherein the first cartridge housing and the second cartridge housing both collectively comprise a plurality of reinforcement ribs disposed thereon.

9. The flashlight apparatus of claim 6, wherein each of the two battery-receiving cavities comprises markings, the markings being configured to distinguish between each of the two battery-receiving cavities based on a tactile feel for the two battery-receiving cavities.

10. The flashlight apparatus of claim 6, wherein the end cap comprises one or more one-way snaps, the one or more one-way snaps being configured to semi-permanently hold the battery cartridge within the flashlight apparatus.

11. The flashlight apparatus of claim 6, further comprising a reinforcement sleeve, the reinforcement sleeve comprising a cylindrical metallic material that is disposed between the body housing and the battery cartridge.

12. The flashlight apparatus of claim 11, wherein the one or more light sources comprises one or more light-emitting diodes, the one or more light-emitting diodes being powered through the use of switch circuitry located at an end of the flashlight apparatus that is disposed opposite from the lens housing, the switch circuitry configured to enable the passage of current through the series of cylindrical batteries which powers the one or more light-emitting diodes.

13. The flashlight apparatus of claim 12, wherein the lens comprises a dual-focus lens.

14. The flashlight apparatus of claim 12, wherein the lens comprises a tri-focus lens.

15. The flashlight apparatus of claim 12, wherein the lens comprises a quad-focus lens.

* * * * *